Sept. 19, 1944.   C. C. MINTER   2,358,467
ELECTRICAL PIEZOMETER
Filed April 21, 1942

INVENTOR.
CLARK C. MINTER
BY
ATTORNEYS.

Patented Sept. 19, 1944

2,358,467

UNITED STATES PATENT OFFICE 2,358,467

ELECTRICAL PIEZOMETER

Clarke C. Minter, East Orange, N. J., assignor to Breeze Corporations, Inc., Newark, N. J.

Application April 21, 1942, Serial No. 439,842

4 Claims. (Cl. 73—31)

This invention relates to electrical measuring instruments responsive to pressure of fluids, as gases, steam and other vapors.

Electrical devices for measuring pressure are well known. The piezo-electric effect has been employed successfully in measuring large variations in pressure, but such devices are not sensitive to small changes in pressure, and the apparatus are complicated and expensive.

The effect of pressure on the resistance of a carbon pile is also well known, but the known method can not be used for accurately measuring small variations in pressure. A rheostat with a pressure actuated, movable contact can be used for measuring small variations in pressure, but such apparatus is difficult to keep in adjustment.

In many cases it has been found that mechanical measurement of pressure at a distance can not be used, owing to the impracticability of running excessive lengths of tubing from the point at which the pressure varies to a point at which the indication is desired.

Experience with the foregoing methods of measuring pressure electrically has shown the urgent need for an accurate, inexpensive and simple electrical piezometer. Therefore, one of the objects of this invention is to provide such an instrument.

A further feature of the invention is to provide an accurate apparatus for measuring pressure at a distance by means of electrical transmission of pressure variations.

The elements which are combined in the invention are all familiar to those skilled in the art. Novelty, however, lies in a modification of the disclosure in my U. S. Patent No. 2,251,751, in which is disclosed a Wheatstone bridge, one arm of which responds to variations in the pressure of the intake manifold of an internal combustion engine, while the other arm of the bridge responds to variations in the thermal conductivity of the exhaust gas from the engine, producing effects described in my U. S. Patent No. 2,025,121, the relation between these two effects being correlated by an uncalibrated, null-point, electrical indicator connected across the Wheatstone bridge.

The device disclosed in Patent No. 2,251,751 can not be used for measuring pressure variations simply by exposing to a gas of fixed conductivity, the arm of a bridge which responds to variations in thermal conductivity of the exhaust gas from the engine, and placing across the bridge a calibrated indicator instead of the null-point indicator employed, for the reason that the measurements include too many large errors, due to temperature variations.

It has been found, by experiment, that in order to employ the basic pressure responsive device disclosed in Patent No. 2,251,751, as a device merely to measure pressure variations quantitatively, it is necessary, first, that the gas in the sealed comparison system be the same as that in the sealed variable system; further, that the pressure of the gas in the two systems be the same; and, finally that a chamber of approximately the same volume as the bellows on the variable side be attached to the fixed or comparison side of the bridge. These disclosures are thought to be novel since they are not obvious to anyone skilled in the art.

These objects and aims together with others, which will later appear, are accomplished by the novel and practical construction, combination and arrangement of parts hereinafter described and illustrated in the accompanying drawing, forming a material part of this disclosure and in which.

Figure 1:
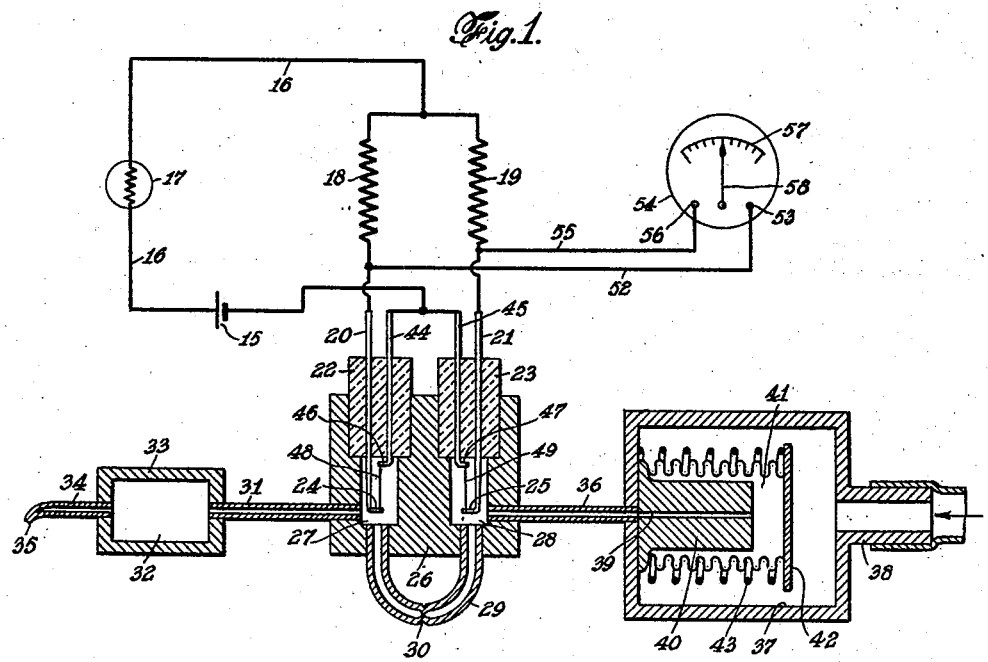
Figure 1 is a schematic diagram showing an embodiment of the invention with certain parts shown in section.

Referring more in detail to the drawing, a source of potential electrical energy is designated by the numeral 15, one of the conductors 16, from which leads to an automatic current regulator 17 of well known type, thence to branches presenting a pair of resistances 18 and 19.

Continuations of the branched conductors are encased in massive leads 20 and 21 set in gas tight insulators 22 and 23 and terminating in angular bends 24 and 25 extending therefrom.

A metal block 26 is shaped to receive the insulators 22 and 23, below which are cells 27 and 28 into which the bent terminals 24 and 25 extend.

These cells are connected at their lower ends by a U shaped leaden tube 29 provided with means for closing the passage therethrough, as at 30.

Leading from the block cell 27 is a capillary tube 31 communicating with the chamber 32 of a container 33, having an inlet 34 provided with a sealable closure 35.

A similar capillary tube 36 leads from the block cell 28 through the wall of a receiver 37 connected with a source of variable pressure by an inlet 38.

The tube 36 is extended to communicate with the passage 39 in an axially drilled core 40, fixed on an inner wall of the receiver, forming the base of a "Sylphon" or metallic bellows 41, having an enlarged outer end or head 42, disposed adjacently opposite the inlet 38; a suitable spring 43, surrounding the bellows between the flanged base of the core 40 and bellows head 42, operates to maintain the bellows in a normally extended position, the inner movement of which is limited by the core 40.

The other conductor, from the electrical source 15, is provided with branches 44 and 45 set in the insulators 22 and 23 respectively, are provided with angular bent terminals 46 and 47 extending into the cells 27 and 28. The terminals 24 and 46, and terminals 25 and 47 are connected respectively by sensitive filaments 48 and 49, forming parallel resistances, in series with resistances 18 and 19 respectively, the combination constituting a well known type of Wheatstone bridge.

The wire 18 is provided with a branch 52 connected to one of the terminals 53 of an indicator mechanism 54, while the wire 19 is similarly connected by a branch 55 to the terminal 56 of the indicator, which is supplied with a scale 57, served by a pointer 58.

In operation the entire cell, chamber, "Sylphon" bellows and tube system is thoroughly evacuated and then filled with gas, as helium or hydrogen, the former being preferred, at an absolute pressure of approximately one millimeter of mercury, through the tube 34, which is then sealed off, as at 35.

When the pressure in the receiver 37 is set to that corresponding to the "zero" point of the indicator scale 57, communication between the cells 27 and 28 is then prevented by closing the passage through the lead tube 29, as at 30. The density of the gas in the chamber 32 and cell 27 will remain constant, while the density in the cell 28 will depend upon the volume of the bellows 41, which will vary with the absolute pressure in the receiver 37.

Any variations of pressure in the receiver 37 will then unbalance the bridge, causing the pointer 58 to take a position on the calibrated indicator scale 57 that will be directly proportional to the pressure in the receiver.

Figure 2:
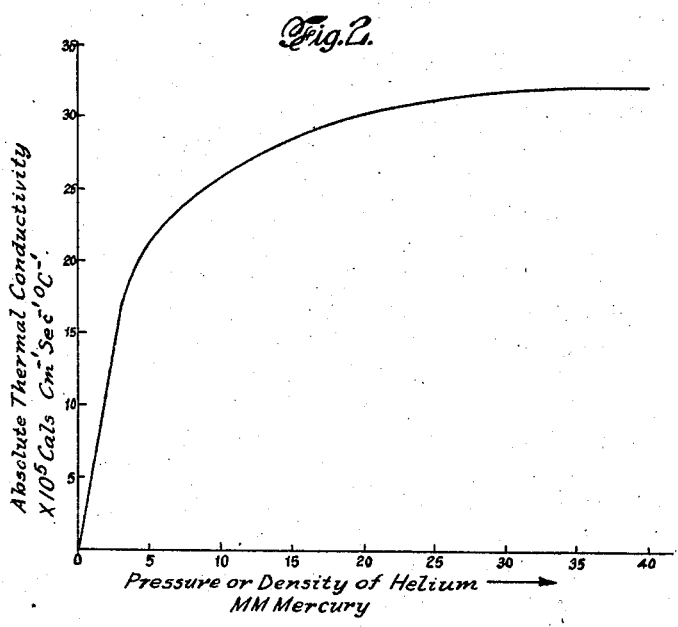
Figure 2 is a graph indicating how the thermal conductivity of the gas varies with pressure.

The operation of the apparatus in determining pressure depends upon the thermal conductivity of the gas in the cell 28 compared with that of the gas in the cell 27. Since the filaments are heated by the current passing through them, the temperature and resistance of the filament 48 in cell 27 will accordingly remain constant so long as the ambient temperature does not change. The density of the gas in the cell 28 does not remain constant but will vary with the volume of the bellows 41 which in turn depends upon the pressure in the receiver 37. Since the thermal conductivity of the gas in cell 28 will vary with density, according to the graph (see Fig. 2), the temperature and resistance of the filament 49 in the cell 28 will vary with the pressure in the receiver 37.

The bridge will accordingly be unbalanced by variations in resistance of the filament 49 in cell 28 and the pointer 58 will move over the scale 57 of the indicator, giving a quantitative indication of the variation of pressure in the receiver 37.

The necessity of having an empty chamber 32 in communication with the cell 27, of approximately the same volume as that of the bellows 41, will be clear from consideration of the well known simple gas laws. Although the pressure in the bellows 41 will be the same as in the cell 28, the gas in the cell 28 will be at a higher temperature, owing to contact with the hot filament 49. Now, when the ambient temperature increases the temperature of gas in the cell 28, it will increase by the same degree as that of the gas in the bellows while the pressure in the system will increase with the gas laws. The ratio of the densities of the gas in the bellows 41 and cell 27 will now be different at the higher ambient temperature, and the density of the gas in the cell 28 will increase, thus increasing the thermal conductivity of the gas therein and introduce a temperature error in the measurement of pressure in the receiver 37.

The relation of densities in the cell 28 and bellows 41 is shown from the gas laws to be as follows:

$$\frac{\text{Density in cell 28}}{\text{Density in bellows 41}} = \frac{\text{Absolute temperature in bellows 41}}{\text{Absolute temperature in cell 28}}$$

That is, at one temperature the ratio of the densities might be, say, 0.85, while at a higher temperature the ratio of the densities might be 0.9, some of the gas from the bellows 41 having gone over in the cell 28 with no movement of the bellows. This is clear from the above relation; since the temperature in 41 is lower than the temperature in 28, an increase in the absolute temperature of both 28 and 41 by the same amount will cause a greater increase in pressure in 41 than in 28, and some of the gas in 41 has to go over into 28 to establish equilibrium. Or, expressed another way, the increase in pressure produced by raising the temperature of a given volume of gas by a given number of degrees, is inversely proportional to the absolute temperature of the gas.

Hence, in order to eliminate the error produced by a change in ambient temperature, it is necessary to place on the opposite side of the bridge a volume of gas approximately as great as that in the bellows 41, and accordingly the chamber 32 is shown in communication with cell 27. The effect of an increase in ambient temperature on the ratio of the densities in 32 and 27 will now be substantially the same as in the case of 41 and 28, and there will be no temperature error in the measurement of pressures in receiver 37.

As changes of construction could be made within the scope of the invention, it is intended that all matter contained in the foregoing description or shown in the accompanying drawing shall be interpreted as illustrative and not in a limiting sense.

Having thus described the invention, what is claimed as new and desired to secure by Letters Patent, is:

1. Apparatus for indicating changes in pressure of a gaseous body, comprising in combination with a Wheatstone bridge, of a chamber receptive of the gaseous body, a bellows in said chamber subject to changes in pressure of said body, a block having a pair of cells, one of said cells being in communication with said bellows, a sealed chamber in communication with the other of said cells and substantially corresponding in internal volume with said bellows, said cells, chamber and bellows being uniformly filled with gas of the same density, a source of electricity connected across one diagonal of the Wheatstone bridge and having leads entering said block, one or more sensitive filaments connected with each lead to extend into the respective cells and constituting elements of the Wheatstone bridge, an indicator, and electrical means connected across said bridge to actuate said indicator whereby changes of pressure in the gaseous body are manifested.

2. In apparatus to indicate changes in pressure of elastic fluids subjected to variable pressure mutations, a Wheatstone bridge, a pocket subject to the fluctuations of the fluids, a pressure capsule in said pocket, resilient means normally expanding said capsule, a sealed chamber, a pair of spaced cells, one communicating with the capsule and the other with the chamber, said capsule and chamber being substantially equal in capacity, said cells, capsule and chamber being filled with gas of fixed density, sensitive filaments in each cell, said filaments constituting elements of the Wheatstone bridge, a source of electric current connected to said bridge, and an electrical indicator connected to said bridge to indicate its unbalancing by change in density of the gas in said capsule.

3. Apparatus for indicating changes in elastic fluid pressure due to variations in pressure imposed thereon, comprising in combination, a Wheatstone bridge including a source of electric current therefor, an indicator connected across said bridge, a closed receiver open to the elastic fluid, a pressure responsive metallic bellows in said receiver, a gas tight chamber, a pair of spaced cells into each of which an element of said bridge extends, said cells, bellows and chamber being filled uniformly with the same variety of gas under uniform pressure, one of said cells being in open communication with said pressure responsive bellows and the other cell with said chamber.

4. A pressure responsive apparatus comprising in combination, a Wheatstone bridge, two spaced isolated cells, a chamber open to one of said cells, a metallic bellows responsive to the pressure to be measured open to the other cell, a pair of sensitive filaments comprising elements of the bridge, one in each cell, a source of electric current connected across said bridge, one of said filaments being subjected to gas under the variable pressure of said bellows and the other filament to a fixed pressure of gas, the gas being uniform throughout, and an indicator actuated by said current as controlled by said bridge.

CLARKE C. MINTER.